A. D. SAXON & J. E. LUNDY.
ANIMAL TRAP.
APPLICATION FILED JUNE 10, 1916.
1,217,350.
Patented Feb. 27, 1917.
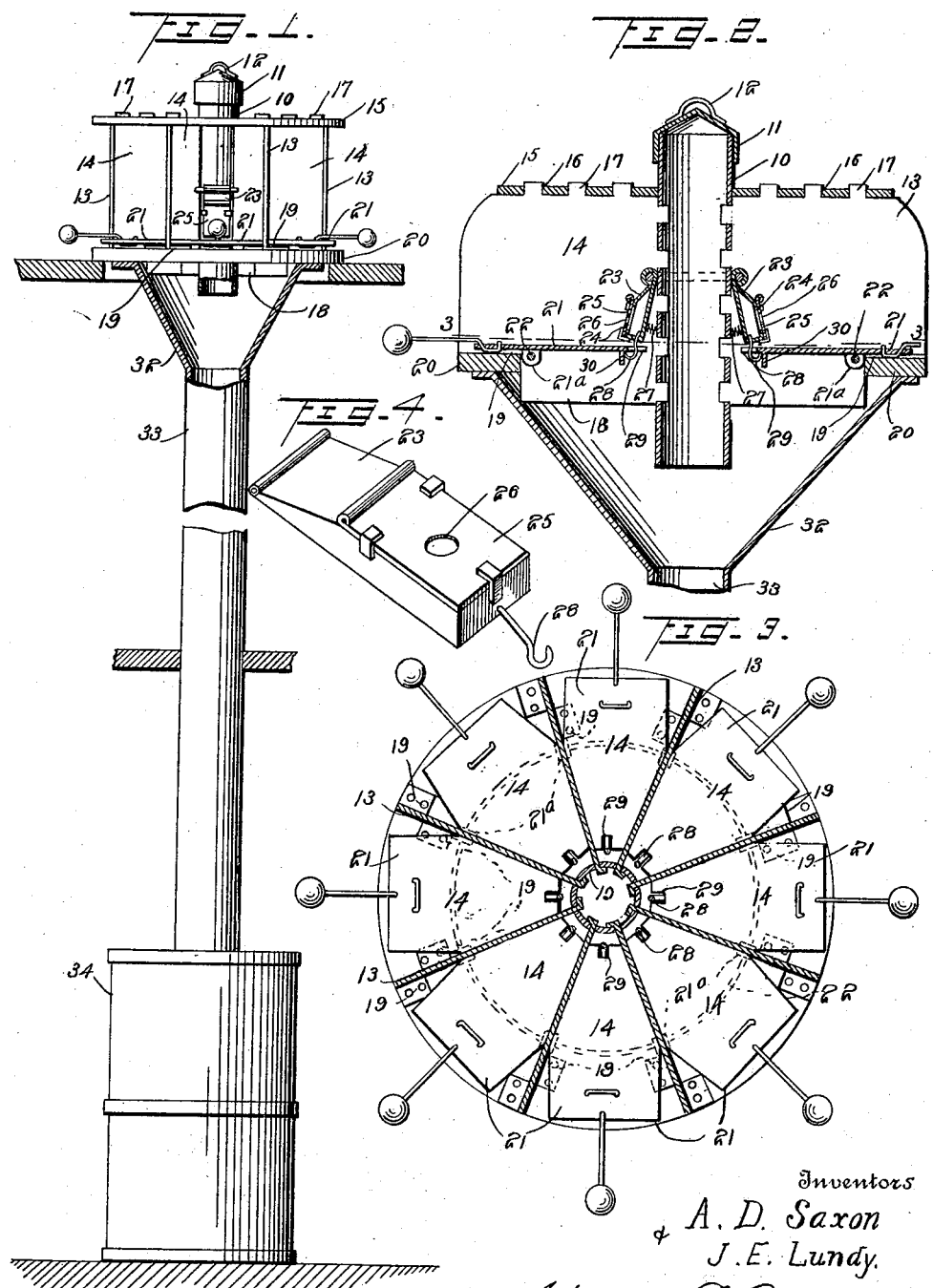
Inventors
A. D. Saxon
J. E. Lundy.
By Watson E. Coleman
Attorney

UNITED STATES PATENT OFFICE.

AUGUSTUS DAVIS SAXON AND JAMES EWARD LUNDY, OF SPRINGFIELD, SOUTH CAROLINA.

ANIMAL-TRAP.

1,217,350.   Specification of Letters Patent.   Patented Feb. 27, 1917.

Application filed June 10, 1916. Serial No. 103,000.

*To all whom it may concern:*

Be it known that we, AUGUSTUS D. SAXON and JAMES E. LUNDY, citizens of the United States, residing at Springfield, in the county of Orangeburg and State of South Carolina, have invented certain new and useful Improvements in Animal-Traps, of which the following is a specification, reference being had to the accompanying drawings.

This invention relates to animal traps, and particularly to traps for catching rats, and the general object of the invention is to provide a very effective, simply constructed, cheaply made, and positive acting trap so formed that a number of rats or other animals may be caught at any one time, and a further object is to construct a trap of the character described having a plurality of trap doors or platforms each disposed in the compartment having bait supported therein, and so formed that when a rat nibbles at the bait the trap door upon which the rat is standing will be released and the rat will be dropped into a barrel, keg or other container from which they may be eventually discharged when sufficient rats have been caught.

A further object of the invention is to provide a construction of this character in which a central tubular standard is used extending down into the barrel or other container in which the rats are eventually deposited, and provide in connection with the tubular standard a plurality of radiating compartments each of which is provided with a trap door as previously described, this tubular member or standard permitting the introduction of poison, poisonous gases or water into the water so as to kill the rats therein.

Other objects will appear in the course of the following description.

The invention is illustrated in the accompanying drawings, wherein:

Figure 1 is a side elevation of our trap, the hopper and chute leading therefrom being in section;

Fig. 2 is a vertical sectional view through the trap and the hopper;

Fig. 3 is a horizontal sectional view on the line 3—3 of Fig. 2; and

Fig. 4 is a perspective view of the bait box.

Referring to these figures, it will be seen that our improved trap comprises a central tubular standard, as it may be termed, designated 10, which at its upper end may be conveniently closed by a cap 11, this standard being provided with a bail 12 whereby the trap itself may be readily handled. Extending radially outward from the central standard 10 are a plurality of partitions 13 which define compartments 14. As illustrated, these partitions are made of sheet metal and the central standard is also made of sheet metal, the partitions being formed with lugs inserted through slots in the sheet metal of the standard so as to connect the inner ends of the partitions to the standards. Extending over the upper edges of the partitions is a covering plate 15 which is approximately circular in form and which is also slotted as at 16, to receive the lugs 17 formed upon the upper edges of the partitions. The outer end of each partition is cut away, as at 18, and the upper wall of this cut-away portion is formed with the oppositely bent lugs 19 whereby the partitions are attached to an annular member or ring 20 which may be made of either wood or metal.

Pivotally mounted in each compartment 14 is a trap door or platform 21 which is approximately segmental in form, the middle portion thereof being formed with ears 21ª, through which ears passes a pintle 22. This pintle is a continuous pintle extending entirely around the trap and forming means for holding the partitions together in proper position as well as forming a pintle upon which the several trap doors rotate. The rear ends of the trap doors rest upon the annulus 20, as illustrated in Fig. 2, and the rear ends of the trap doors are preferably weighted by outwardly extending rods carrying weights so that normally the trap door is supported from rotation in a vertical plane.

Hingedly mounted in each compartment 14 and preferably mounted upon the standard 10 is a bait receptacle 23 which is in the form of a box larger at its bottom than at its top having a large opening 24 normally closed by a sliding plate 25 which moves in guides on the face of the box, this plate being formed with a central opening 26. A spring 27 is attached to the back of the box and bears against the face of the standard so as to urge the lower portion of the bait box outward. The bait box carries a hook 28 and the inner end of each trap door 20 is cut away as at 29, the portion so cut away being bent downward to form a lug 30, this lug, however, being disposed outward of the outer edge of said recess 29. When the trap is set the hook 28 is engaged with the inner end of the trap door just forward of this lug 30, the inner end of the trap door being cut away, as at 29, as previously described, to accommodate the shank of the hook. Now when the rat attempts to get the bait he will push against the bait box in his attempt to get the bait out, which will push the bait box inward and release the hook from the inner end of the trap door, and inasmuch as the rat or other animal is resting on the inner end of the trap door it follows that the trap door will be depressed and the rat will be precipitated into the receptacle upon which the trap is placed. As soon as the rat has fallen through the trap door the trap door will again close and will automatically engage with the hook 28 so that the trap door re-sets itself.

We have illustrated the trap body as heretofore described as being disposed on a metallic receptacle 32, circular in form and upon which the annulus 20 rests and to which it may be attached, if necessary. This metallic receptacle, as illustrated, is hopper-shaped at its bottom, and extending from the hopper-shaped bottom is a pipe 33 which discharges into a receptacle 34 in the form of a barrel or keg. It is obvious, however, that the intermediate receptacle 32 may be dispensed with and that the body of the trap may be set immediately upon the top of the keg 34. We regard it, however, as best to provide the intermediate receptacle 32 as this is made of sheet metal, and has perfectly smooth walls up which the rats cannot possibly climb. Furthermore, this tubular member 33 may extend to any desired length and the body of the trap may be set upon a loft floor while the chute formed by the members 32 and 33 may extend downward to the ground or cellar and discharge the rats into a receptacle placed at this point where they could be conveniently killed or captured. Where the intermediate receptacle is relatively short or where the body of the trap rests directly upon a container, as for instance, the container 34, the tubular standard 10 may be used as a convenient means for discharging poison or poisonous gases or like lethal means into the receptacle to thereby kill the rats.

While we have shown certain details of construction which we have found to be thoroughly effective in practice, we do not wish to be limited to these as it is obvious that many changes might be made in these details without departing from the spirit of the invention. It will be seen that the body of the trap forms a complete closure for the receptacle 32 or any construction upon which it is placed, that a large number of rats may be caught at the same time, that the rats or other animals coming from any direction will be guided into the proper compartment and will not have to search for the cheese or other bait, and that there is practically no chance for the rat to escape once it has attacked the bait. If the body of the trap is disposed on one floor and the receptacle 34 on another floor or in a cellar, it is obvious that there will be no rats within the trap itself except those nibbling at the bait and therefore that the rats will not be scared away by the presence of trapped rats.

Having described the invention, what we claim is:

1. In a trap, a central tubular standard open at both ends, a plurality of partitions radiating from the standard and defining compartments, the standard extending up above the top of the compartments, a plurality of trap doors forming each the floor of one compartment and counterbalanced to normally remain in a horizontal position but depressible under the weight of an animal, and a receptacle upon which said trap is disposed and into which said trap doors discharge, the central tubular standard forming the means whereby a lethal agent may be conducted into said receptacle.

2. An animal trap of the character described comprising a tubular standard, a plurality of radial partitions extending from the standard and defining a plurality of compartments, a roof plate extending entirely over the compartments and attached to the standard, a plurality of trap doors forming the floors of the several compartments, each of said trap doors being pivotally mounted upon the partitions of the compartment and normally supported in a horizontal position, and a bait receptacle mounted upon the standard in each compartment and having a latch member connected thereto normally engaging the free edge of the corresponding trap door to prevent its depression but releasing said trap door when the bait is tampered with, and a receptacle into which said trap discharges.

3. A trap of the character described including a central standard, partitions radiating therefrom and defining a plurality of compartments, an annular member to which the outer ends of each of the partitions is connected, a roof plate extending over all of the compartments and attached to the upper edges of the partitions, trap doors forming the floors of the several compartments, each trap door being pivotally connected to the partitions, the trap doors being counterbalanced to remain normally in a horizontal position, bait boxes hingedly supported upon the central standard and dispsed one in each compartment, each bait box at its lower end having a hook engaging with the free edge of the corresponding trap door, and a spring normally urging the lower end of the bait box outward and into operative position.

4. In a trap of the character described, a central standard, radiating partitions mounted upon the standard, a roof plate mounted upon the upper end of the partitions and extending over all the compartments defined by the partitions, trap doors forming the bottom of each compartment and having ears formed thereon, and a pintle member extending through all of the compartments and through said ears forming the means of pivotally supporting the trap doors and for holding the partitions in proper position relative to each other and the central standard.

In testimony whereof we hereunto affix our signatures in the presence of two witnesses.

AUGUSTUS DAVIS SAXON.
JAMES EWARD LUNDY.

Witnesses:
  H. A. JUMPED,
  T. L. BEAN.

Copies of this patent may be obtained for five cents each, by addressing the "Commissioner of Patents, Washington, D. C."